(12) United States Patent
Valeriano et al.

(10) Patent No.: US 7,257,200 B2
(45) Date of Patent: Aug. 14, 2007

(54) AUTOMATED NOTIFICATION SYSTEMS AND METHODS

(75) Inventors: Francisco M. Valeriano, Torrance, CA (US); Daniel Manchala, Torrance, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/114,708

(22) Filed: Apr. 26, 2005

(65) Prior Publication Data

US 2006/0240803 A1    Oct. 26, 2006

(51) Int. Cl.
*H04M 1/64* (2006.01)
(52) U.S. Cl. ................. 379/88.12; 455/412.1
(58) Field of Classification Search ........... 379/221.11, 379/201.12, 211.03, 88.12; 600/300, 369; 455/412.1
See application file for complete search history.

(56) References Cited

U.S. PATENT DOCUMENTS

| | | | |
|---|---|---|---|
| 6,404,880 B1 * | 6/2002 | Stevens | 379/221.11 |
| 6,556,666 B1 * | 4/2003 | Beyda et al. | 379/88.12 |
| 6,730,026 B2 * | 5/2004 | Christ et al. | 600/300 |
| 2002/0178022 A1 | 11/2002 | Anderson et al. | |
| 2003/0212648 A1 | 11/2003 | Horvitz | |
| 2004/0044738 A1 | 3/2004 | Austin-Lane et al. | |
| 2004/0105122 A1 | 6/2004 | Schaeffer | |
| 2004/0128359 A1 | 7/2004 | Horvitz et al. | |
| 2004/0150518 A1 | 8/2004 | Phillips et al. | |
| 2004/0167804 A1 | 8/2004 | Simpson et al. | |
| 2004/0172454 A1 | 9/2004 | Appelman et al. | |

* cited by examiner

*Primary Examiner*—Gerald Gauthier
(74) *Attorney, Agent, or Firm*—Fay Sharpe LLP

(57) ABSTRACT

An automated notification method comprises detecting an event requiring a notification to a user, determining a level of urgency of the event, selecting a notification method (from predetermined user-specified notification methods) based on the level of urgency of the event, performing the notification method, and dynamically changing the notification method depending upon a change in the level of urgency of the event and upon user response.

20 Claims, 3 Drawing Sheets

AUTOMATED NOTIFICATION SYSTEMS AND METHODS

BACKGROUND

Embodiments herein generally relate to automated notification methods and systems that select a notification method (from predetermined user-specified notification methods) based on the level of urgency of the event and dynamically change the notification method depending upon a change in the level of urgency of the event and upon user response.

Automated notification methods are useful in providing information to users from monitoring systems. For example, U.S. Patent Publication 2004/0105122 discloses a printer control and information management system that provides for notifications to the appropriate personnel in order to resolve problems which may arise from the operation of the various equipment utilized in the enterprise network system. Information can be redirected to anyone within the system, the user identifying the manner and format of the information to be presented.

In paragraph 45, U.S. Patent Publication 2004/0105122 discloses a peripheral management module that provides notifications when a printer needs servicing. This can be as minor as a paper jam or a printer or other peripheral device needing paper, or more complicated situations such that a service technician needs to review or needs to perform service on the machine. In 2004/0105122, an escalating alert notification model is provided. On an alert event basis, the system is configured such that more urgent alerts are provided when more complex problems are discovered. Within the printer control and document management system of the described embodiment certain events may occur that go unnoticed and the notification system exists to call attention to these events. An alert event is defined as some abnormal condition that exists within the various peripheral components involved in the secure end-to-end delivery of information within the health care facility complex. An alert notification is the information used to describe that abnormal event. A notification mechanism is used to communicate to the recipient of the alert modification. A notification event is defined as the transmission of the alert notification and alert mechanism. The variable amount of lapse time between notification events during an unresolved alert event is an alert interval, and an alert schedule is the number of alert intervals defined for a particular event for each component involved in the system. According to 2004/0105122, notification escalation is used as a process of scheduling each notification event at the appropriate intervals when an alert event remains unsolved.

Further, in 2004/0105122 on an alert event basis, the system can be configured for the alert schedule and alert intervals, each using an independent notification mechanism. Upon execution of each alert interval, one or more alert recipients can be designated through the use of one or more notification mechanisms. Alert mechanisms include, but are not limited to, network message, e-mail, visual on-screen alert, auditory alert, pager, computerized voice mail call directly to the recipient's telephone, a local application launch, a remote application launch or an error log entry. By using variable criteria for an alert event, variable notification mechanisms, variable number of alert intervals, a variable alert schedule, and variable number of alert recipients, the probability of rapid alert event resolution is maximized.

In a similar system disclosed U.S. Patent Publication 2004/0044736 delivering an electronic notification to an intended recipient may include communicating an electronic notification directed to an intended recipient, and determining presence information associated with the intended recipient before attempting to deliver the notification to the intended recipient. A cascaded delivery instruction also may be resolved based on notification information. The presence information and the cascaded delivery instruction may be used to select among several delivery mechanisms potentially available for the intended recipient based on the presence information, and to deliver the electronic notification to the intended recipient at the selected delivery mechanism. The presence information may include an online presence and/or a physical presence of the intended recipient.

In paragraph 78 of 2004/0044736, the notification delivery service may require that the delivery mechanism confirm receipt of the notification or that the user has received the notification. For example, the delivery mechanism may provide an acknowledgement to the notification delivery service at the time at which the delivery mechanism receives the notification. The delivery mechanism also may acknowledge receipt of the notification only after the user has accessed the notification, or otherwise indicated recognition of the notification, within, for example, a predetermined period of time (e.g., an "idle time" threshold period). If the delivery mechanism fails to confirm receipt of the notification, the notification delivery service may perform a redelivery process. The redelivery process may include, for example, redelivery to the delivery mechanism that failed to confirm receipt. That redelivery may continue until a confirmation is received or a predetermined failure threshold is reached. The redelivery process also may include selection of and delivery to another delivery mechanism associated with the user (e.g., delivery to a pager or to email rather than to a preferred mobile phone). Redelivery in this manner may be selected, for example, based on a failure to receive a confirmation indicating that the user has accessed or recognized the notification within the "idle time" threshold period. The delivery process may continue until a delivery mechanism to which delivery of the notification is made confirms that the notification is received. Once a delivery mechanism confirms that the notification is received, the notification delivery process may conclude.

However, conventional systems such as the ones disclosed in 2004/0105122 and 2004/0044736 have shortcomings that the embodiments herein overcome. The most relevant of these shortcomings are described in the following paragraphs. The system disclosed in 2004/0105122 requires the existence of a problem associated with the notification and an element of the system in charge of tracking the solution of the problem. That additional requirement constrains the domains in which the system described in 2004/0105122 could be applied. Moreover, being problem centric, the main goal for the system described in 2004/0105122 is to find a resolution for the problem without delay so notifications are sent to multiple recipients hoping that one of them would solve the problem. Lacking an effective feedback mechanism for individual notifications, the system described in 2004/0105122 may cause that multiple people may be working on the same problem without them being aware of that. On the other hand, the system described in 2004/0044736 fails to take into consideration the dynamic nature of priority for notifications. Also, the goal of the system described in 2004/0044736 is to send notifications to people without delay and that causes it not to consider the optimal use of all available channels. Using the presence information as the main mechanism to identify the channel to be used makes a sub-optimal utilization of channels, as there are many instances when users would like to be notified using a channel in which they are not present at the moment or instances when they would like not to be notified in channels where they are present. Finally, the system described in 2004/0044736 does not consider the likelihood of a notification in a channel being consumed by the user as a characteristic of the channel used to select the delivery method. These shortcomings of previous systems are solved by the embodiments disclosed herein. The system described in the disclosed embodiments does not require the existence of a problem which solution would need to be tracked, nevertheless this system can be used to deliver and track notifications about problems to identified recipients. The system disclosed in the embodiments herein complements the delivery channels with acknowledgement mechanisms that create an effective user controlled feedback about the notification being consumed. The disclosed system also matches the priority of notifications with the appropriate channels so as to make an effective use of all available channels. Finally, the disclosed system also considers the notion of dynamic levels of urgency so that notifications that started as urgent notifications directed to priority channels, could be directed to other less intrusive channels if the urgency of the notification changes.

SUMMARY

An automated notification method embodiment disclosed herein comprises detecting an event requiring a notification to a user, determining a level of urgency of the event, selecting a notification method (from predetermined user-specified notification methods) based on the level of urgency of the event, performing the notification method, and dynamically changing the notification method depending upon a change in the level of urgency of the event and upon user response.

If the user does not respond to the notification method, one embodiment can repeat the notification method and/or change the notification method until the user does respond. In one embodiment, the method obtains user input to establish the user-specified notification method. This user input can comprise ranking different notification methods with respect to different levels of urgency; providing an order in which the notification methods should be used; and/or providing a frequency of notification repetition.

As mentioned above, the embodiments herein dynamically change the notification method. This can be performed by selecting a notification method that is more likely to obtain attention as the urgency level increases or selecting a notification method that is less likely to obtain attention but is also less intrusive as the urgency level decreases according to predetermined standards or according to predetermined indications established by each user individually. Therefore, the method continuously/periodically monitors conditions to determine the level of urgency. Further, the processes of selecting of the notification method and dynamically changing the notification method are based, in part, upon current time and date. When dynamically changing the notification method, embodiments herein can change the mode of notification (where the mode relates to the delivery vehicle, such as e-mail, paging, cell phone, PTA etc.); change the frequency at which notifications are sent (by increasing or decreasing how often they notifications are sent to the user); and/or repeating said notification even after the user acknowledges the notification.

An automated notification system embodiment uses a detector to detect the event requiring a notification to a user. Further, an evaluator is used to determine the level of urgency of the event. A notification engine selects the notification method (from the predetermined user-specified notification methods) based on the level of urgency of the event. Again, the notification engine dynamically changes the notification method depending upon a change in the level of urgency of the event. Delivery managers perform the notification method that is selected by the notification engine.

As with the method embodiment, if the user does not respond to the notification method, the notification engine can repeat the notification method and/or change the notification method until the user does respond. A user input is included with the system embodiment to obtain the user input when establishing the user-specified notification method.

The notification engine dynamically changes the notification method by selecting a notification method that is more likely to obtain attention as the urgency level increases or selecting a notification method that is less likely to obtain attention as the urgency level decreases. The evaluator is adapted to monitor conditions to determine the level of urgency. The processes of selecting the notification method by the evaluator and dynamically changing the notification method by the notification engine are based, in part, upon current time and date.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

This embodiment proposes improvements on existing notification systems. Users subscribe with notification systems to be informed when a certain event or events happen. Notification systems are excellent mechanism to decouple the sources of the events (publishers) with the consumers of these notifications (subscribers).

Notifications can be distributed through an increasingly number of different delivery mechanisms (web-posting, email, instant messaging, cell-phone, etc). Most notification systems support a single delivery mechanism, but some new notification systems also support multiple mechanisms.

For example, in a commercial print shop, there are multiple printers generating events that need to be communicated to print shop operators. These events have different levels of urgency. Some events that need urgent attention are for example: "paperjam" or "empty toner cartridge". Some other events, such as for example "low toner cartridge", are less urgent and the resolution for them can wait for some time.

Subscribers to the events usually have multiple channels that they can use to receive notifications. In the print shop example, the operator Joe Smith can have available the following channels: home phone number, office phone number, email address, pager, etc.

Different channels have different levels of likelihood to get the user's attention. Users would like to use the channels that get the most attention from them to receive only the most urgent notifications and use low attention channels to receive notifications that can wait. The diagram in FIG. 1 shows examples of how different channels could be used for different notifications based on the urgency of the event.

Figure 1:
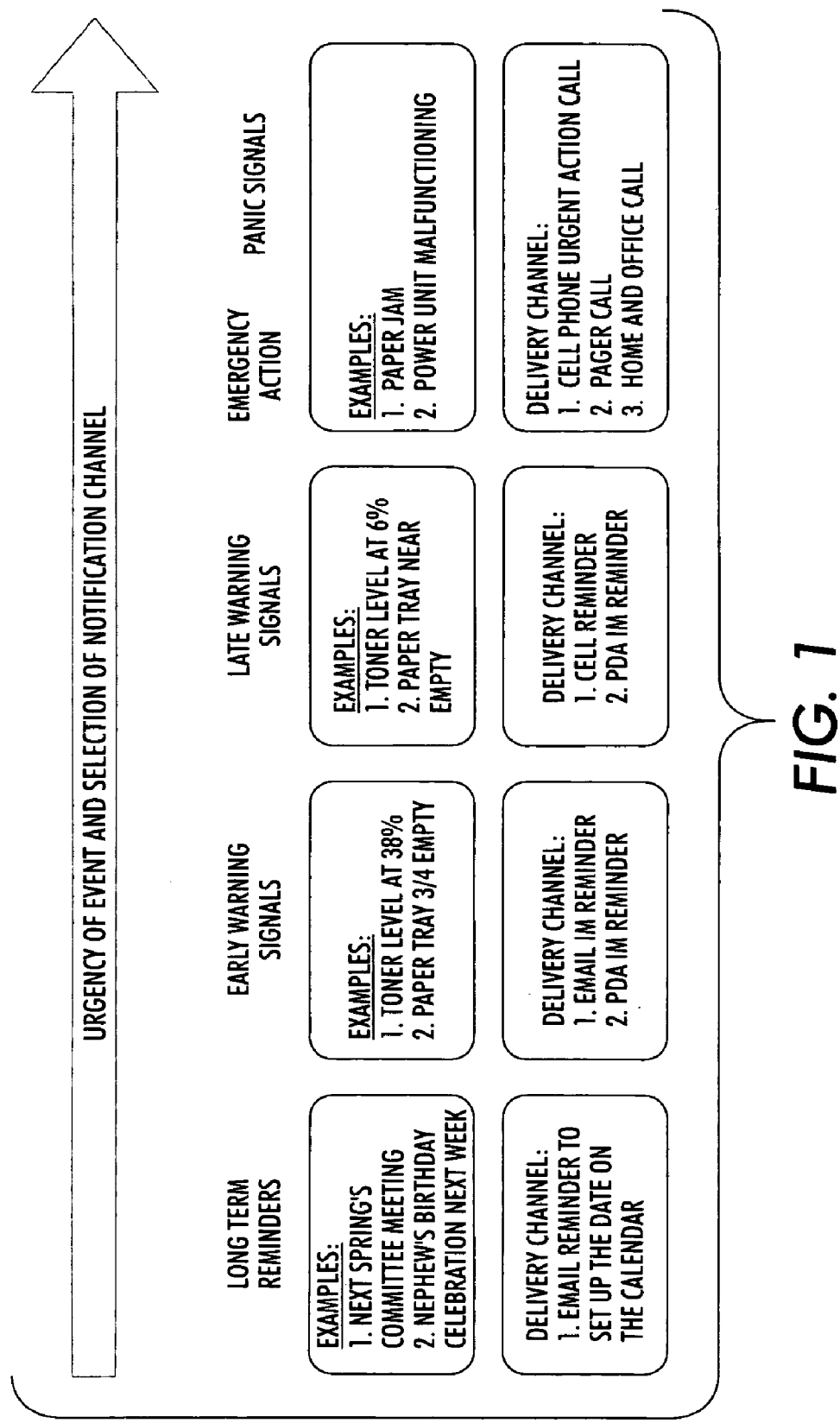
FIG. 1 is a schematic diagram showing urgency of events and selection of notification schedule.

More specifically, FIG. 1 illustrates one non-limiting example of user-specified notification preferences. One of the preferences relates to long-term reminders which can include such things as committee meetings, birthdays, etc. and the mode of notification (delivery channel) is sent as an e-mail reminder to set a date on the user's calendar. In addition, different types of warning signals such as (but not limited to) early warning signals, late warning signals, and panic signals needing emergency action can be defined by the user. The user may decide that a certain toner level (e.g., 38%) or the paper tray being a certain amount (e.g., ¾) empty may require early warning signals. The delivery channel specified by the user for such early warning signals is an e-mail instant message (IM) reminder or a personal digital assistant (PDA) instant messaging reminder. Late warning signals are provided as each of the conditions worsens. For example, when the toner level reaches a lower percentage (e.g., 6%) or one of paper tray is nearly empty, late warning signals can be provided. For these late warning signals, in this example, the user has specified that the delivery channel or mode of delivery shall comprise a cell phone reminder or voice message, and a PDA instant message reminder. FIG. 1 also illustrates panic signals that require emergency action for such items as a paper jam, or a malfunctioning power unit. With respect to the panic signals, the delivery channel selected by the user in this example includes a cell phone urgent action call, a page, a home call, and an office call. While FIG. 1 does not illustrate the frequency at which the delivery channels will repeat the message, or the order in which the different delivery channels will send the message, as explained in greater detail below, embodiments herein provided many different methodologies for providing notification to the user over the selected channels.

Figure 2:
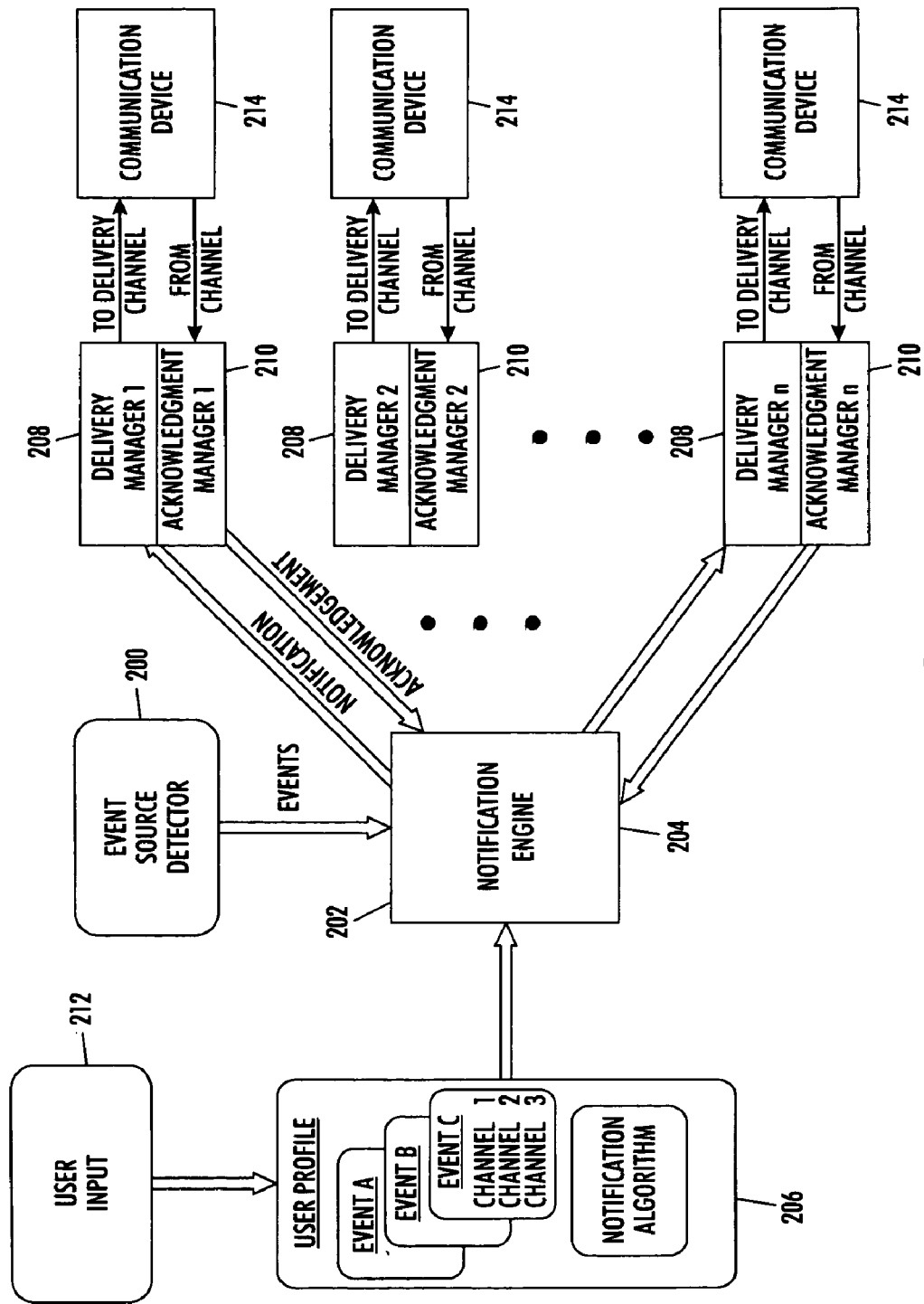
FIG. 2 is a schematic representation of a system embodiment.

The embodiments herein provide a multi-channel notification system that is capable of changing the preferred channel for sending the notification at any time before the notification is acknowledged by the user. The FIG. 2 is a representation of the elements of the system. More specifically, an automated notification system embodiment is shown in FIG. 2. In this embodiment, a detector 200 detects an event requiring a notification to a user. This detector 200 can comprise any form of automated or semi-automated system such as an alarm notification system associated with structures, machinery, and vehicles; a news event based system, such as a stock quote system; a medical monitoring system, etc. Therefore, as would be understood by one ordinarily skilled in the art in light of this disclosure, the detector 200 can comprise a software program or a hardware sensor. In addition, the detector 200 can comprise a hardware device that includes logic.

Further, an evaluator 202 (which can be included within, or be separate from a notification engine 204) is used to determine the level of urgency of the event. The notification engine 204 selects the notification method (from the predetermined user-specified notification methods maintained within a user profile 206) based on the level of urgency of the event. Delivery managers 208 perform the notification method that is selected by the notification engine 204. As would be understood by one ordinarily skilled in the art in light of this disclosure, the evaluator 202, notification engine 204, and delivery manager 208 can comprise software programs and/or hardware devices that included logic sufficient to accomplish the tasks described.

The notification engine 204 dynamically changes the notification method depending upon a change in the level of urgency of the event. A user input 212 such as a GUI is included with the system embodiment to obtain the user input when establishing the user-specified notification method.

This multi-channel notification system changes the preferred channel for notifications dynamically. For each supported delivery mechanism (web, email, phone, etc), the system defines a way to obtain an acknowledgement of the notification from the user. At setup time, the user defines a set of notification channels (email addresses, phone numbers, etc) and ranks them based on how likely a notification on that channel would get his/her attention. The user also specifies a subset of channels to be used for each type of event and the method that the system should follow when using these channels. In one of its embodiments, the method specifies that the system should send a notification using the first channel of the list, if the user does not acknowledge the notification within a specified time, the system would send the notification using the next channel and so on until an acknowledgement is received or the list is exhausted.

The acknowledgement managers 210 wait for a response to the notification. If the user does not respond to the notification method, the notification engine 204 can repeat the notification method and/or change the notification method until the user does respond. All delivery mechanisms (communication devices 214) have an associated acknowledgement mechanism. All the delivery mechanisms that are supported by the notification system are provided an associated mechanism to receive acknowledgments from the user. This is useful since many of the delivery mechanism used to distribute notifications do not support an intrinsic channel for sending acknowledgments. For example, if a voice mail system is used for sending notifications to a user, the system provides an additional channel for the user to send an acknowledgement after the user listened to the voice mail notification. In this example, one of the possible implementations for this additional channel is that the voice message that contains the notification would say at the end ". . . Please, call 1-800-???-???? to acknowledge the reception of this notification . . . ". In some other cases, the same notification channel could be used to implement the acknowledgement mechanism. For example, some email systems provide a read receipt that notifies the sender that the recipient has opened the message. Another example is a notification by phone where the user can acknowledge a message by saying "OK" and a voice recognition system on the sending side would mark the notification as acknowledged.

The notification engine 204 dynamically changes the notification method by selecting a notification method that is more likely to obtain attention as the urgency level increases, or selecting a notification method that is less likely to obtain attention but is also less intrusive as the urgency level decreases. The evaluator 202 is adapted to monitor conditions to determine the level of urgency. The processes of selecting the notification method and dynamically changing the notification method are based, in part, upon current time and date. The user specifies the set of channels to be used for notification of events. Each one of these channels is rated based on the likelihood that a notification on that channel would get the user attention (and different channels could be used at different times of the day, and at different types of days, such as holidays vs. workdays). Also for each one of the events the user is subscribed to, the user identifies a subset of channels that should be used to send notifications for that specific event.

The preferred channel for sending a notification could change based on the time/date, the amount of time elapsed since the occurrence of the event, the amount of time elapsed since the last notification was sent, the availability of any given channel or the number of attempts made to send the notifications. Some of these methods may be prepackaged with the system while others may be defined by the user.

As an example of a prepackaged method, the system starts with the first channel (the less intrusive one) that is specified in the user-defined list for that event and sends the notification using that channel. If the channel is not available or if an acknowledgement is not received within a specified period of time, the system sends a notification using the next channel on the user-defined list. This process continues until an acknowledgement is received or the list of channels is exhausted.

As an example of a user defined method if an event of a given priority X happens, the method sends an email to a work email address. If two hours pass without an acknowledgement, the method sends an instant message. If instant messaging is not available, the method sends a voice message to a cell phone number. If the cell phone is not available or the user does not acknowledge the message within two hours, the method sends another voice message to the cell phone. The method continues doing this until the user acknowledges the message.

Figure 3:
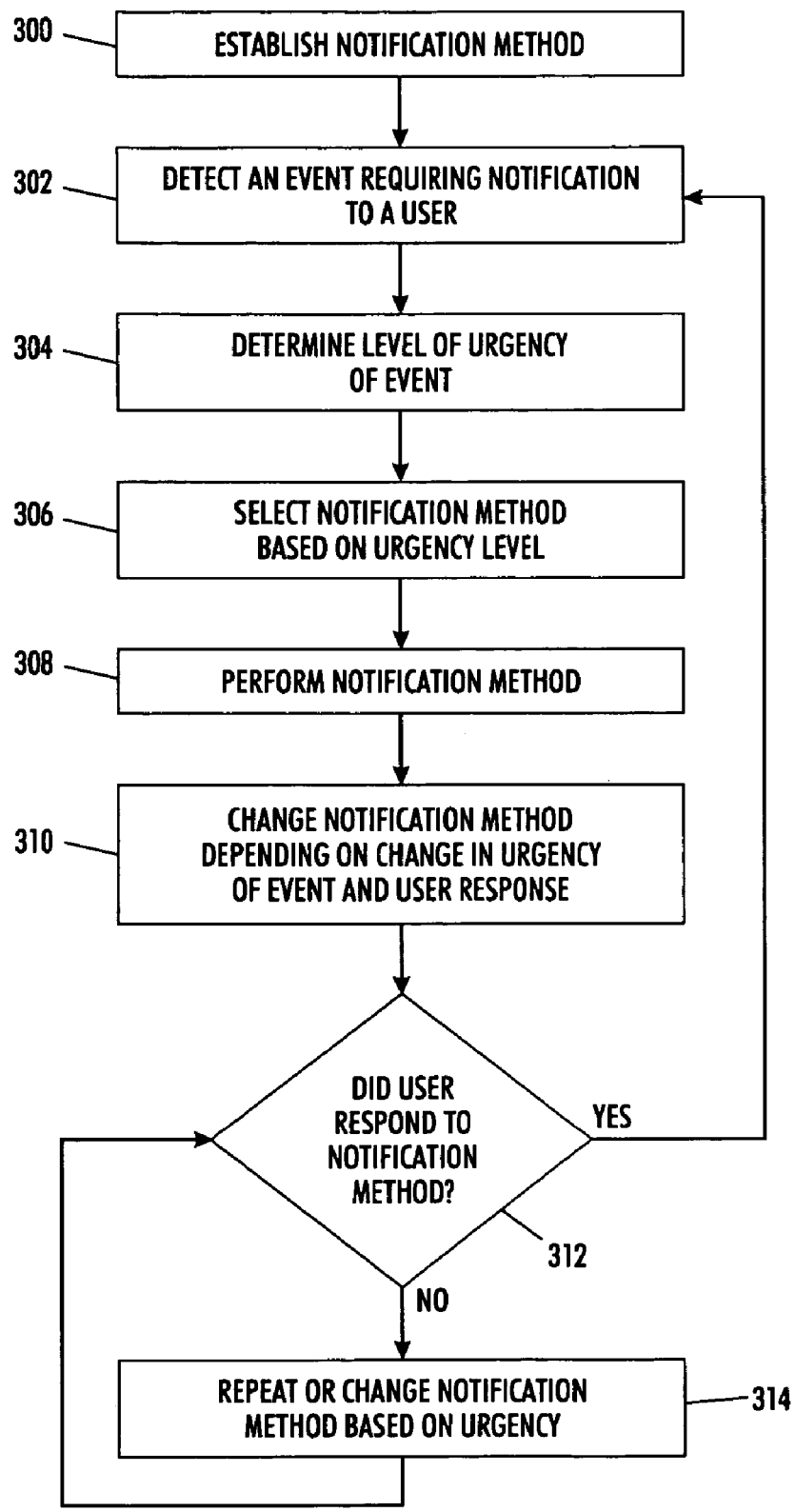
FIG. 3 is a flowchart illustrating a method embodiment.

An automated notification method embodiment is illustrated in flowchart form in FIG. 3. In item 300, the method obtains user input to establish the user-specified notification method or relies upon a supplied, standard notification method scheme. This user input can comprise ranking different notification methods with respect to different levels of urgency; providing an order in which the notification methods should be used; and/or providing a frequency of notification repetition, etc.

In item 302, this embodiment detects an event requiring a notification to a user. In item 304, the level of urgency of the event is determined. Then, in item 306, this embodiment selects a notification method (from the predetermined user-specified or standard notification methods) based on the level of urgency of the event. Item 308 represents the process of actually performing the notification method and item 310 illustrates the embodiment's ability to dynamically change the notification method depending upon a change in the level of urgency of the event and upon user response. As mentioned above, the embodiments herein dynamically change the notification method. This can be performed by selecting a notification method that is more likely to obtain attention as the urgency level increases or selecting a notification method that is less likely to obtain attention as the urgency level decreases.

If the user does not respond to the notification method, as indicated by decision diamond 312, the notification method can be repeated and/or changed as indicated by item 314. As shown by the loop back to item 312, the repeating/changing of the notification method can be repeated until the user does respond. Once the user responds, processing returns to item 302 to detect the next event. By returning to item 302 after the user responds, the embodiments herein provide the ability to repeat notification of an acknowledged event, in case the user forgets to take appropriate action after acknowledging the notification. Therefore, the method continuously/periodically monitors conditions to determine the level of urgency.

When dynamically changing the notification method, embodiments herein can change the mode of notification; change the frequency at which notifications are sent (by increasing or decreasing how often the notifications are sent to the user); and/or repeat the notification even after the user acknowledges the notification. The "mode" or channel of notification relates to the delivery vehicle utilized to provide the notification to the user. Different channels or modes of notification can include e-mail, instant messaging, broadcasting (such as over a loudspeaker or wireless radio system), paging, telephone, cell phone, PDA, or any other similar notification mode whether now known or developed in the future. Therefore, depending upon the mode of notification selected, different communication devices 214 such as a computer, telephone, PDA, will be contacted by the delivery managers 208.

This aspect of dynamically changing the notification method can accommodate any methodology the user can create. Therefore, a user may decide that a low urgency message be provided by e-mail, and a higher urgency message be provided to the user's cell phone or PDA. Alternatively, or in combination with changing the mode of notification, the frequency at which notifications are provided can also be changed. Further, this change in frequency can be used judiciously and selectively established by the user. Therefore, one notification methodology can provide that a single e-mail be followed by a single text message, and that the remaining notifications be repeatedly made over a user's cell phone. This exemplary methodology can further provide that the frequencies at which cell phone notifications are sent increase periodically. Therefore, one methodology of notification could begin by providing one notification every 30 minutes and decrease the time between notifications by 5 minutes after each notification is sent, whereby the second notification would be sent 25 minutes after the first notification and a third notification would be sent 20 minutes after the second notification, and so on.

Similarly, if the urgency of the event decreases the mode of notification can return to a lower urgency-type mode and the frequency at which notifications are provided can similarly decrease. Therefore, for example, if a user were provided with an automated stock price notification, the frequency at which notifications were provided can increase as the stock price changes and the notification frequency can decrease as the stock price returns to its previous level.

Further, in some cases where notifications require an action by the user which outcome can be detected by the system, notifications can continue even after a user acknowledges a notification. For example, the user can establish a methodology whereby if the situation that caused the notification is not corrected or acted upon within a predetermined time period, the notification cycle can be reactivated or a new notification could be created, even if the user has acknowledged a previous notification. This feature will account for a situation where a user acknowledges a notification and then forgets to take the appropriate action.

Benefits of the system include that it distributes the notifications through multiple channels in an effective manner. It is quality-of-service friendly since it makes sure the notifications are actually read. It is effective in delivering important notifications to subscribers while avoiding overusing the most critical channels. Notification is important in production systems to inform operators, support personnel, sales representatives, etc. of different conditions that are monitored and are critical for quality of service purposes. System and customer support, content management, e-commerce, on-line trading, news tracking are just some examples of types of applications that benefit from the system described above.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An automated notification method comprising:
   detecting an event requiring a notification to a user;
   determining a level of urgency of said event selectively corresponding to one of a plurality of warning signals;
   selecting a first notification method from a plurality of predetermined user-specified notification methods based on said level of urgency of said event;
   performing said notification method;
   continuing to monitor said event to determine whether a change in urgency level occurs; and
   dynamically selecting a second notification method depending upon a change in said level of urgency of said event, wherein the second notification method associated with the new urgency level is used and the first notification method associated with the prior urgency level is discontinued.

2. The method according to claim 1, further comprising, if said user does not respond to said selected notification method, one of repeating said selected notification method and selecting an alternative notification method until said user does respond.

3. The method according to claim 1, further comprising obtaining user input to establish said user-specified notification methods.

4. The method according to claim 3, wherein said user input comprises:
   ranking different notification methods with respect to different levels of urgency;
   providing an order in which said notification methods should be used; and
   providing a frequency of notification repetition.

5. The method according to claim 1, wherein said dynamically selecting a second notification method comprises:
   selecting the second notification method that is more likely to obtain attention as specified by the user as said urgency level increases; and
   selecting the second notification method that is less likely to obtain attention as specified by the user as said urgency level decreases.

6. The method according to claim 1, further comprising monitoring conditions to determine said level of urgency.

7. The method according to claim 1, wherein said dynamically selecting said second notification method comprises at least one of:
   changing a mode of notification;
   changing a frequency at which notifications are sent; and
   repeating said second notification method after said user acknowledges said notification.

8. An automated notification method comprising:
   detecting an event requiring a notification to a user;
   determining a level of urgency of said event wherein the urgency level corresponds to one of a selected set of warning signals;
   selecting a first notification method corresponding to the one selected warning signal from a plurality of predetermined user-specified notification methods based on said level of urgency of said event;
   performing said first notification method;
   continuing to monitor said event to determine whether a change in urgency level occurs corresponding to a selection of an other one of the warning signals; and
   dynamically changing said first notification method to a second notification method depending upon a change in said level of urgency of said event and upon user response, wherein the second notification method associated with the new urgency level and user response is used and the first notification method associated with the prior urgency level and user response is discontinued.

9. The method according to claim 8, further comprising, if said user does not respond to said first notification method, one of repeating said first notification method and changing to said second notification method until said user does respond.

10. The method according to claim 8, further comprising obtaining user input to establish said first and second user-specified notification methods.

11. The method according to claim 10, wherein said user input comprises:
    ranking different notification methods with respect to different levels of urgency;
    providing an order in which said notification methods should be used; and
    providing a frequency of notification repetition.

12. The method according to claim 8, wherein said dynamically changing of said first notification method comprises:
    selecting the second notification method that is more likely to obtain attention as specified by the user as said urgency level increases; and
    selecting the second notification method that is less likely to obtain attention as specified by the user as said urgency level decreases.

13. The method according to claim 8, further comprising monitoring conditions to determine said level of urgency.

14. The method according to claim 8, wherein said dynamically changing of said first notification method comprises at least one of:
    changing a mode of notification;
    changing a frequency at which notifications are sent; and
    repeating said notification after said user acknowledges said notification.

15. An automated notification system comprising:
    a detector adapted to detect an event requiring a notification to a user;
    an evaluator adapted to determine a level of urgency of said event selectively corresponding to one of a plurality of warning signals;
    a notification engine adapted to select a notification method from a plurality of predetermined user-specified notification methods corresponding to the one warning signal and based on said level of urgency of said event; and
    delivery managers adapted to perform said notification method,
    wherein said notification engine is adapted to dynamically change said notification method depending upon the change in the determined level of urgency of said event and discontinue the performing of the prior notification method.

16. The system according to claim 15, wherein, if said user does not respond to said notification method, said notification engine is adapted to one of repeat said notification method and change said notification method until said user does respond.

17. The system according to claim 15, further comprising a user input adapted to obtain user input to establish said user-specified notification method.

18. The system according to claim 15, wherein when said notification engine dynamically changes said notification method, said notification engine is adapted to:

select a notification method that is more likely to obtain attention as specified by the user as said urgency level increases; and select a notification method that is less likely to obtain attention as specified by the user as said urgency level decreases.

19. The system according to claim 15, wherein said evaluator is adapted to monitor conditions to determine said level of urgency.

20. The system according to claim 15, wherein a process of dynamically changing said notification method by said notification engine comprises at least one of:

changing a mode of notification;

changing a frequency at which notifications are sent; and repeating said notification after said user acknowledges said notification.

* * * * *